(12) United States Patent
Versteylen et al.

(10) Patent No.: US 9,056,446 B2
(45) Date of Patent: Jun. 16, 2015

(54) ABSORBENT FOOD PAD

(75) Inventors: Sayandro Versteylen, Fontana, CA (US); Richard Beu, Yorba Linda, CA (US); Lindsay A. Riehle, Beaumont, CA (US)

(73) Assignee: Paper-Pak Industries, Laverne, CA (US)

( * ) Notice: Subject to any disclaimer, the term of this patent is extended or adjusted under 35 U.S.C. 154(b) by 0 days.

(21) Appl. No.: 13/168,779

(22) Filed: Jun. 24, 2011

(65) Prior Publication Data

US 2012/0003424 A1 Jan. 5, 2012

Related U.S. Application Data

(60) Provisional application No. 61/360,339, filed on Jun. 30, 2010.

(51) Int. Cl.
*B32B 3/24* (2006.01)
*B32B 27/10* (2006.01)
*B32B 3/26* (2006.01)

(52) U.S. Cl.
CPC ......... *B32B 27/10* (2013.01); *Y10T 428/24331* (2015.01); *B32B 3/266* (2013.01); *B32B 2439/70* (2013.01)

(58) Field of Classification Search
CPC ...................................................... B32B 3/266
USPC ................... 428/137, 138; 426/133
See application file for complete search history.

(56) References Cited

U.S. PATENT DOCUMENTS

| | | | |
|---|---|---|---|
| 4,384,972 A | 5/1983 | Nakamura et al. | |
| 4,664,922 A | 5/1987 | Leon et al. | |
| 4,762,722 A | 8/1988 | Izumimoto et al. | |
| 5,383,324 A | 1/1995 | Segers et al. | |
| 5,489,399 A | 2/1996 | Koyakumaru et al. | |
| 5,690,955 A * | 11/1997 | Griffiths et al. | 424/443 |
| 6,209,289 B1 | 4/2001 | Cullen et al. | |
| 6,210,725 B1 | 4/2001 | Colombo | |
| 6,447,826 B1 | 9/2002 | Matthews | |
| 6,520,323 B1 | 2/2003 | Colombo | |
| 6,592,919 B1 | 7/2003 | Matthews et al. | |
| 6,616,861 B1 | 9/2003 | Evans et al. | |
| 7,147,799 B2 | 12/2006 | DelDuca et al. | |
| 7,189,666 B2 | 3/2007 | Finnegan et al. | |
| 7,205,016 B2 | 4/2007 | Garwood | |
| 7,241,481 B2 | 7/2007 | Speer et al. | |
| 7,365,034 B2 | 4/2008 | Boehmer et al. | |
| 7,387,205 B1 | 6/2008 | Wilson | |
| 7,776,416 B2 | 8/2010 | Kinard et al. | |
| 8,114,358 B2 | 2/2012 | Benedek et al. | |

(Continued)

FOREIGN PATENT DOCUMENTS

| | | |
|---|---|---|
| AU | 2002301108 B2 | 5/2009 |
| EP | 0527228 A1 | 2/1993 |
| WO | 2005012132 A1 | 2/2005 |

OTHER PUBLICATIONS

Canadian Office Action dated Nov. 14, 2013 for Canadian application No. 2745023.

*Primary Examiner* — William P Watkins, III
(74) *Attorney, Agent, or Firm* — Ohlandt, Greeley, Ruggiero & Perle, LLP

(57) ABSTRACT

An absorbent food pad having an active agent positioned selectively in a pad architecture to provide superior performance.

19 Claims, 5 Drawing Sheets

(56) References Cited

U.S. PATENT DOCUMENTS

| | | |
|---|---|---|
| 8,414,997 B2 | 4/2013 | Schmidt |
| 2001/0031298 A1 | 10/2001 | Fuller |
| 2004/0016212 A1 | 1/2004 | Miller |
| 2005/0037114 A1 | 2/2005 | Weems et al. |
| 2007/0048415 A1* | 3/2007 | Etchells et al. ............... 426/235 |
| 2007/0210281 A1 | 9/2007 | Speer et al. |
| 2007/0292568 A1 | 12/2007 | Kaufman et al. |

* cited by examiner

ABSORBENT FOOD PAD

CROSS-REFERENCE TO RELATED APPLICATIONS

The present application claims benefit of U.S. Provisional Application No. 61/360,339, filed on Jun. 30, 2010, which is hereby incorporated by reference.

BACKGROUND OF THE DISCLOSURE

Field of Disclosure

The present disclosure relates to an absorbent food pad having an active agent positioned selectively therein to provide superior performance.

SUMMARY OF THE DISCLOSURE

There is provided an absorbent food pad having an active agent, preferably in a laminate layer, that is positioned selectively in a structural pad architecture. There is also provided such a pad that has superior performance.

DETAILED DESCRIPTION OF THE DISCLOSURE

Figure 1:
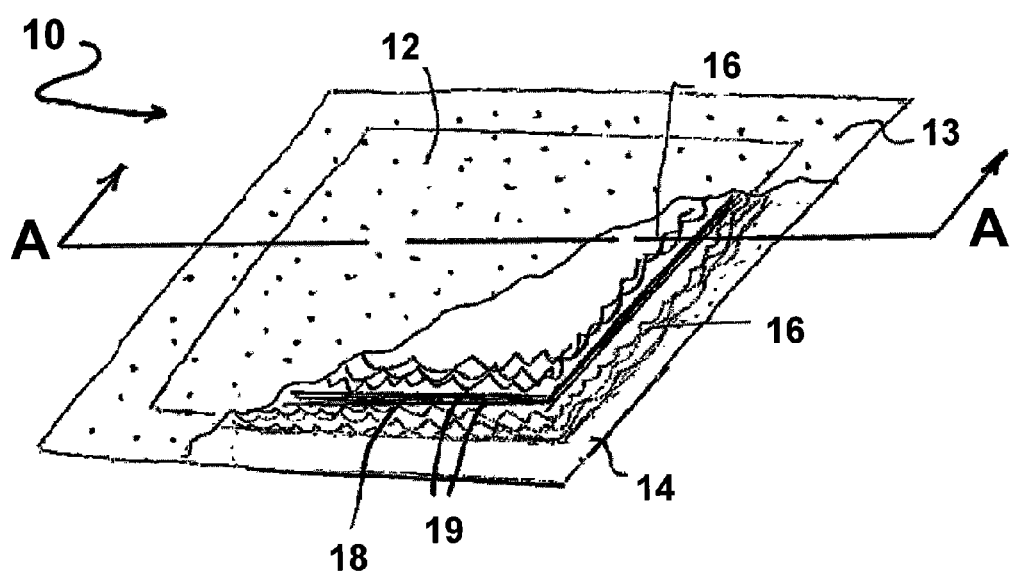
FIG. 1 is a perspective view of an exemplary embodiment of an absorbent food pad of the present disclosure, with a portion cut away to reveal the interior of the absorbent food pad.
Figure 2:
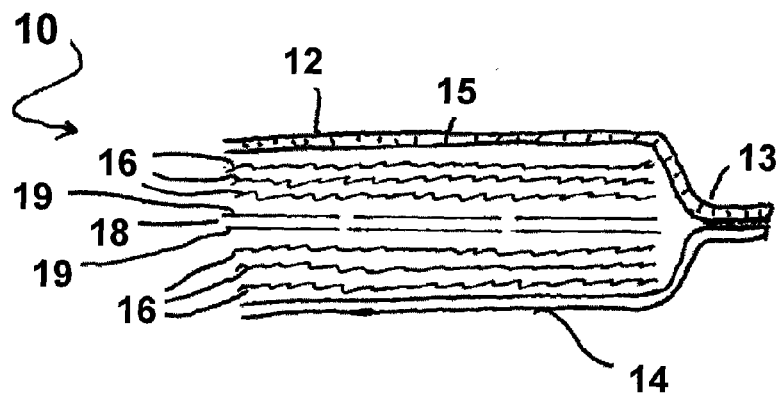
FIG. 2 is a cross-section of an exemplary embodiment of the absorbent food pad in FIG. 1 taken along axis A-A to include an edge of the absorbent food pad.
Figure 3:
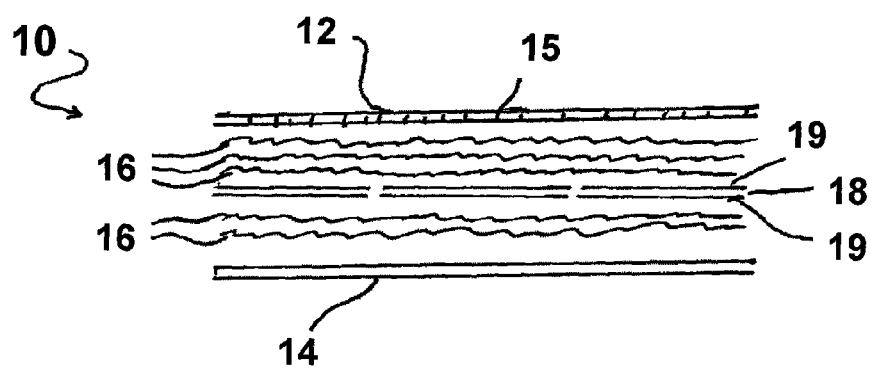
FIG. 3 is a cross-section of another exemplary embodiment of the absorbent food pad in FIG. 1 taken along axis A-A to include a center portion of the absorbent food pad.

Referring to the drawings, and in particular, FIGS. 1 through 3, there is illustrated an exemplary embodiment of an absorbent food pad of the present disclosure generally represented by reference numeral 10. Absorbent food pad 10 has a top layer 12, and a bottom layer 14 opposite top layer 12. When absorbent food pad 10 is placed in a food tray (not shown), top layer 12 is in contact with the food product, and bottom layer 14 is in contact with the food tray. Between top layer 12 and bottom layer 14 are one or more tissue layer 16, which are preferably a tissue layer. Between top layer 12 and bottom layer 14 is a laminate 18. Laminate 18 is positioned with at least one tissue layer 16, and preferably two or more tissue layers 16, on either side thereof. Absorbent food pad 10 is sealed around its periphery at edge 13 by top layer 12 and bottom layer 14 directly contacting each other along their entire peripheries.

Referring to FIGS. 1 through 3, an exemplary embodiment of absorbent food pad 10 has top layer 12 made of polyethylene film that is perforated with perforations 15 to allow liquids to pass through. Bottom layer 14 is made of coffee filter tissue (CFT). Each tissue layer 16 is made of a sheet of cellulose tissue. Laminate 18 is one or more plies 19 of a cellulosic material and an active agent. In an exemplary embodiment, laminate 18 is made of a mixture of cellulosic material and $CO_2$-generation system (active agent) that is a mixture of citric acid and sodium bicarbonate, which, when activated with water or other liquid, react with each other to generate $CO_2$.

In an exemplary embodiment, two (2) plies 19 of laminate 18 are positioned among six (6) tissue layers 16, so that at least one tissue layer 16 is above laminate 18, and at least one tissue layer 16 is below laminate 18. In another exemplary embodiment, the two (2) plies 19 of laminate 18 are positioned among five (5) layers of tissue layer 16. In yet another exemplary embodiment, the two (2) plies 19 of laminate 18 are positioned among four (4) layers of tissue layer 16, with two tissue layers 16 above and two tissue layers 16 below laminate 18. The two plies 19 of laminate 18 can be directly adjacent to each other, or one or more tissue layer 16 can be positioned between the two plies 19 of laminate 18.

Referring to FIG. 2, top layer 12 is made of a blown polyethylene film having perforations 15. Bottom layer 14 is made of coffee filter tissue (CFT). Six (6) tissue layers 16 are between top layer 12 and bottom layer 14. Two (2) plies 19 of laminate 18 are positioned such that three (3) tissue layers 16 are between top layer 12 and laminate 18 and three (3) tissue layers 16 are between bottom layer 14 and laminate 18. Top layer 12 and bottom layer 14 are sealed at edge 13 around the periphery of absorbent pad 10 to completely enclose tissue layers 16 and laminate 18. 3.36 grams of a $CO_2$-generation system are in the two plies 19 of laminate 18.

Referring to FIG. 3, top layer 12 is made of a blown polyethylene film having perforations 15. Bottom layer 14 is made of coffee filter tissue (CFT). Five (5) tissue layers 16 are between top layer 12 and bottom layer 14. Two (2) plies 19 of laminate 18 are positioned such that three (3) tissue layers 16 are between top layer 12 and laminate 18, and two (2) tissue layers 16 are between bottom layer 14 and laminate 18. Top layer 12 and bottom layer 14 are sealed at edge 13 around the periphery of absorbent pad 10 to completely enclose tissue layers 16 and laminate 18. 3.02 grams of a $CO_2$-generation system are in two plies 19 of laminate 18.

Tissue layers 16 and laminate 18 contain absorbent material that absorbs moisture and liquids that exude from a food product placed on absorbent food pad 10. The number of tissue layers 16, as well their arrangement in the pad architecture of absorbent food pad 10, are varied to regulate the absorption for the absorbent food pad, as well as activation of any active agents therein. As used in this application, the "pad architecture" of an absorbent food pad means the structure and order of individual layers of tissue layers 16, laminate 18, and active agents therein. "Regulation" means controlling the speed, location, and amount of liquid absorption, as well as controlling activation speed and duration of release of active agents. Thus, varying pad architecture can be used to regulate uptake of liquids exuded by a food product on absorbent food pad 10, and regulate activation, rate of release, and duration of the active agent between and including top layer 12 and bottom layer 14. A pad architecture that physically separates the individual chemical components of an active agent with tissue layers can be selected to delay activation and/or provide an "extended release" of the active agent contained in absorbent food pad 10. For example, positioning a larger number of tissue layers 16 above and/or below laminate 18 can delay activation and extend release of active agents (e.g., a $CO_2$-generation system) in laminate 18. In an exemplary embodiment, positioning three tissue layers 16 above and below laminate 18 can delay activation and serve as a reservoir for extended release of the $CO_2$-generation system in laminate 18.

Laminate 18 in the pad architecture offers several advantages for absorbent food pad 10. First, laminate 18 has the capacity to incorporate large amounts of an active agent in a relatively thin structure, while avoiding the disadvantages of having large amounts of dry, loose chemicals that can cause the pad to "bulge" or have active agents that gather disproportionately in one portion of absorbent food pad 10 when picked up by an edge. Second, because active agents can be uniformly distributed in laminate 18, selecting a prescribed length and the number of plies 19 of laminate 18 permits the amount of active agent to be determined with certainty. In a first exemplary embodiment of absorbent food pad 10, 3.8 grams of a $CO_2$-generation system are uniformly distributed among the two plies 19 of laminate 18. In a second exemplary embodiment of absorbent food pad 10, 5 grams of a $CO_2$-generation system are uniformly distributed among the two plies 19 of laminate 18. Using the approximation that each 1 gram of a $CO_2$-generation system is able to generate about 150 cc of $CO_2$ gas, 5 grams of a $CO_2$-generation system can generate about 750 cc of $CO_2$ gas in a food package over time. An advantage of incorporating large amounts of active agent in laminate 18 is the large reservoir of active agent available for "extended release" of the active agent over time. Still another advantage is generating a large gas volume of $CO_2$ (e.g., 750 cc), thereby creating an internal "bubble" (gas) pressure in a food package that reduces contact between the surface of the food product inside the package and the lidding film (not shown). This is particularly advantageous when absorbent food pad 10 is placed in a food package having a "biofriendly" lidding film (which tends to be less elastic than a conventional lidding film) and/or a "biofriendly" food tray, such as those food trays made of polyethylene (PET), which tend to adhere poorly to lidding films.

An exemplary embodiment of laminate 18 is a cellulosic material and a $CO_2$-generation system (e.g., citric acid and sodium bicarbonate) uniformly distributed therein that are combined to form one or more plies 19 of laminate 18.

Examples of active agent(s) in laminate 18 in absorbent food pad 10 include, but are not limited to, components of a $CO_2$-generation system, oxygen scavenging system, ethylene inhibitor, an antimicrobial, or any combinations thereof. An exemplary embodiment of a $CO_2$-generation system are an acid and a base, such as citric acid and sodium bicarbonate, respectively, that react with each other (when activated by water or other liquid) to generate $CO_2$ gas. The acid component of the $CO_2$-generation system may be a food-safe organic acid or an inorganic acid. The ratio and amounts of acid and base, as well as their physical placement in the pad architecture, can be varied to control the timing and amount of $CO_2$ released. In one exemplary embodiment, citric acid and sodium bicarbonate are present in laminate 18 in a ratio of about 4:6, which can be activated by moisture and/or other food exudates to generate $CO_2$ gas. Citric acid provides an additional benefit by interacting with the sodium ion of sodium bicarbonate to create a citric acid/sodium citrate buffer system that helps maintain a pH that is food-compatible. Other acids may be selected for a $CO_2$-generation system, with amounts and ratios adjusted in accordance with the $pK_a$ of the acid. Another example of active agent in laminate 18 is an antimicrobial agent. Examples of an oxygen scavenging system include, but are not limited to, enzymes such as glucose oxidase, catalase, oxidoreductase, invertase, amylase, maltase, dehydrogenase, hexose oxidase, oxygenase, peroxidase, cellulase, or any combinations thereof. Other examples of an oxygen scavenging system include an oxidizable metal such as iron, zinc, copper, aluminum, tin, or any combinations thereof. Examples of an antimicrobial agent include organic acids (including, but not limited to, citric acid, sorbic acid, lactic acid, or combinations thereof), quaternary ammonium compound, inorganic acid, or combinations thereof.

Top layer 12 of absorbent food pad 10 is a film that is polyethylene, polypropylene, polyester, or any combinations thereof. In an exemplary embodiment, the polyethylene film of top layer 12 is a blown polyethylene film. The blown polyethylene film can have a thickness of about 0.65 mil. The polyethylene film can be perforated to allow moisture and liquid exuded from a food product on absorbent food pad 10 to pass through to tissue layers 16 and laminate 18 to be absorbed. Alternatively, top layer 12 can be made of coffee filter tissue (CFT). Yet another alternative is top layer 12 made of a nonwoven material.

The coffee filter tissue (CFT) of bottom layer 14 can be made of a 16.5-pound white crepe paper that is about 99.5% softwood pulp. Softwood pulp, as used herein, means a pure virgin wood pulp that has never been processed. The softwood pulp can be bleached or unbleached. CFT can also contain about 0.5% of a wet-strength resin to give strength to the cellulosic fibers of the CFT when wet. An example of a wet-strength resin includes, but is not limited to, polyamide-epichlorohydrin (PAE) resin. Alternatively, bottom layer 14 can be a nonwoven material, which can be a hydrophilic nonwoven or treated with a surfactant or other hydrophilic material to permit liquid uptake into tissue layers 16 and laminate 18.

Tissue layers 16 and plies 19 of laminate 18 form an absorbent core 17 of absorbent food pad 10. In one exemplary embodiment, absorbent core 17 has outer dimensions of three-and-an-eighth inches (3.125") (7.9 cm) by five-and-a-half inches (5.5") (14 cm). In another exemplary embodiment, absorbent core 17 has outer dimensions of three-and-a-quarter inches (3.25") (8.3 cm) by four-and-three-quarter inches (4.75") (12.1 cm).

Absorbent food pad 10 is sealed around the periphery at edge 13 by top layer 12 and bottom layer 14 directly contacting each other along their entire peripheries, thereby enclosing absorbent core 17 with gaps of about a half-inch (0.5") (1.3 cm) all around.

Figure 4:
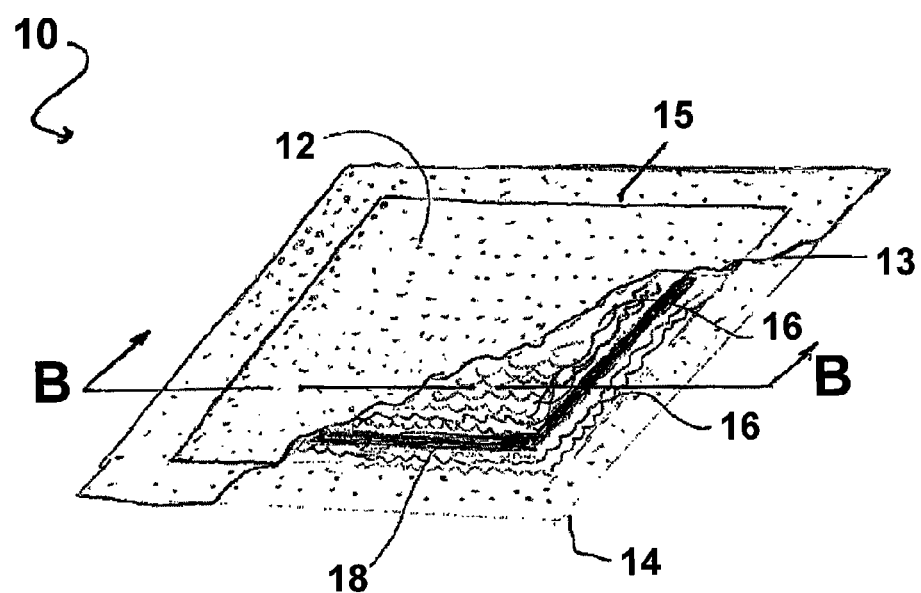
FIG. 4 is a perspective view of another exemplary embodiment of an absorbent food pad of the present disclosure, with a portion cut away to reveal the interior of the absorbent food pad.
Figure 5:
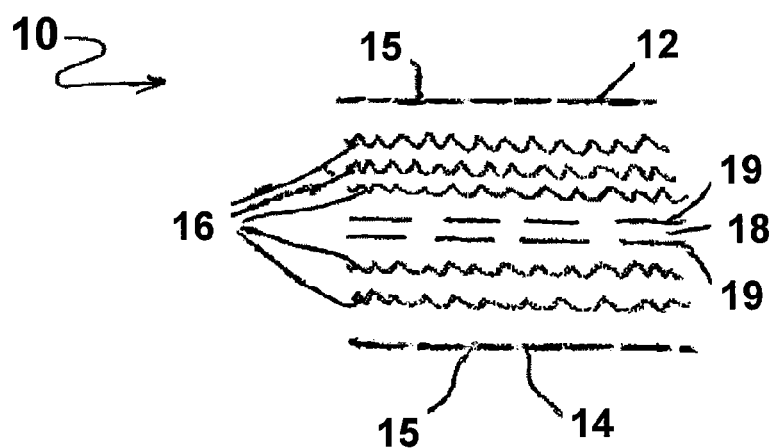
FIG. 5 is a cross-section of an exemplary embodiment of the absorbent food pad in FIG. 4 taken along axis B-B to include an edge of the absorbent food pad.
Figure 6:
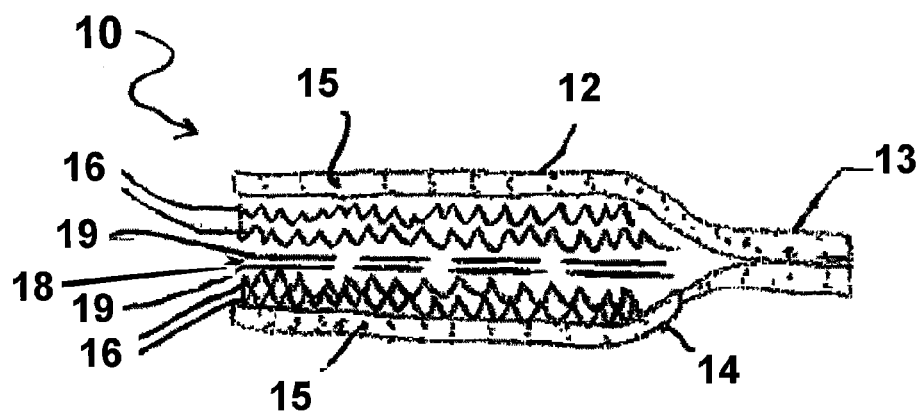
FIG. 6 is a cross-section of another exemplary embodiment of the absorbent food pad in FIG. 4 taken along axis B-B to include a center portion of the absorbent food pad.

Referring to FIGS. 4 through 6, there are illustrated exemplary embodiments of absorbent food pad 10 that have the same general pad architecture described for the embodiments of absorbent pad 10 above, except that top layer 12 and bottom layer 14 are both made of polyethylene film. The polyethylene film has perforations 15 that allow liquid that exudes from foods to pass through to absorbent material in one or more tissue layers 16 and laminate 18.

Referring to the embodiment of FIG. 5, top layer 12 and bottom layer 14 are each made of a blown polyethylene film having perforations 15. Six (6) tissue layers are between top layer 12 and bottom layer 14. Two (2) plies 19 of laminate 18 are positioned such that three (3) tissue layers 16 are between top layer 12 and laminate 18, and three (3) tissue layers 16 are between bottom layer 14 and laminate 18. Top layer 12 and bottom layer 14 are sealed at edge 13 around the periphery of absorbent pad 10 to completely enclose tissue layers 16 and laminate 18. 3.36 grams of a $CO_2$-generation system are in the two plies 19 of laminate 18.

Referring to the embodiment of FIG. 6, top layer 12 and bottom layer 14 are each made of a blown polyethylene film having perforations 15. Five (5) tissue layers 16 are between top layer 12 and bottom layer 14. Two (2) plies 19 of laminate 18 are positioned such that three (3) tissue layers 16 are between top layer 12 and laminate 18, and two (2) tissue layers 16 are between bottom layer 14 and laminate 18. Top layer 12 and bottom layer 14 are sealed at edge 13 around the periphery of absorbent pad 10 to completely enclose tissue layers 16 and laminate 18. 3.02 grams of a $CO_2$-generation system are in two plies 19 of laminate 18.

Figure 7:
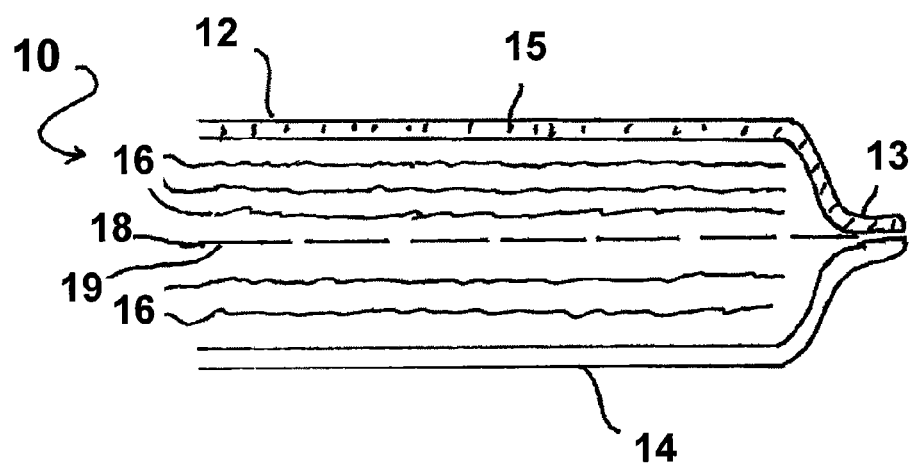
FIG. 7 is a cross-section of another exemplary embodiment of the absorbent food pad in FIG. 1 taken along axis A-A to include a center portion of the absorbent food pad.

Referring to the exemplary embodiment of FIG. 7, top layer 12 is made of a blown polyethylene film having perforations 15. Bottom layer 14 is made of coffee filter tissue (CFT). Five (5) tissue layers 16 are between top layer 12 and bottom layer 14. One (1) ply 19 of laminate 18 is positioned such that three (3) tissue layers 16 are between top layer 12 and laminate 18, and two (2) tissue layers 16 are between bottom layer 14 and laminate 18. Top layer 12 and bottom layer 14 are sealed at edge 13 around the periphery of absorbent pad 10 to completely enclose tissue layers 16 and laminate 18. About 2.66 grams of a $CO_2$-generation system are in ply 19 of laminate 18. The preferred outer dimensions of this exemplary embodiment of absorbent food pad 10 are about five-and-a-quarter inches (5.25") by about seven-and-a-quarter inches (7.25").

Scaling, i.e., selecting the proper amounts of active agent in relation to the amount of absorbent material and the type of food product being packaged, is critical to performance of absorbent pad 10. Some food products (such as ground meats) produce very little moisture or liquid exudates (also called "purge" in this application) that would be available to activate the active agent, while other foods (such as chicken, injected meats, sliced tomatoes, and cut celery) produce a large amount of moisture or liquid exudates that must be absorbed. For example, if absorbent food pad 10 has too many tissue layers 16 relative to the amount of liquid purge, there may be insufficient liquid to dissolve the active agent(s) for activation. Conversely, too few tissue layers 16 and a large volume of liquid purge can dilute or even "drown" the active agent, thereby impairing its effectiveness.

The amount of active agent in the pad architecture of the absorbent food pad of the present disclosure for a given headspace area may also be tailored depending on several factors, including, but not limited to: the total volume of the food tray; the amount of the food product in the food package (i.e., how much volume or headspace the food product occupies); how much of the active agent, such as $CO_2$, is expected to be lost after the food package is sealed (e.g., by dissolving of the active agent in the moisture on the surface of the food product, and/or by leaking of the active agent through the lid film or food tray outside of the headspace); and other physical factors, such as temperature and pressure. For example, if too much of an active agent is selected for a particular headspace area, the gas pressure from the active agent can cause food package to "balloon" or even blow out the lid film or the seal between the lid film and food tray. Conversely, if too little of an active agent is used for a particular headspace area, the active agent may be unable to replace losses of the headspace gas, leading to deflection inward of the lid film, which can lead to unfavorable results such as the lid film touching the food product or even collapse of the food package. Likewise, as noted above, the pad architecture can be tailored to regulate the rate of release of the active agent. For example, using a pad architecture where portions of the active agent are physically separated can provide a sustained release of an active agent (such as $CO_2$) to provide maximum capacity of the active agent in the food package while avoiding blow-ups of the package at the beginning of shelf life, when the original headspace gases have not yet been absorbed. Also, when a smaller food tray is used that has a smaller headspace, a smaller amount of the active agent(s) is needed.

The absorbent food pads disclosed herein can be used in food packages to extend shelf life and food freshness, and to enhance the appearance of packaged foods.

Absorbent food pads of the present disclosure can also be used to compensate for gradual losses of gas volume inside a food package that can cause the food package to collapse inward and/or cause the lidding film to adhere to the surface of the food product, reducing eye appeal and making the food product more susceptible to "freezer burn."

Absorbent food pads of the present disclosure can also be used to reduce headspace requirements and food tray sizes for Modified Atmosphere Packaging (MAP). For example, placing an absorbent food pad of the present disclosure is able to generate sufficient $CO_2$ to permit a reduction in headspace requirements for MAP (and thus food tray size) of approximately 20%. This permits the overall dimensions of the food tray to match the actual size of the food product more closely, thereby reducing costs of materials (tray, lidding (barrier) film, and/or pressurized gases used for MAP), and reducing freight costs. In addition, smaller food packages have more consumer appeal and permit more food packages to be displayed for sale.

Examples of food products that can be packaged with the absorbent food pads disclosed herein include, but are not limited to, turkey, chicken, pork, and beef. The food products may be a single piece, such as a breast of turkey, or may be smaller pieces, such as ground turkey. Smaller food pieces have a large surface area that can absorb gases in a food package, and so would benefit from an absorbent food pad disclosed herein, which can replenish an active agent, such as $CO_2$, in the headspace after the food package is sealed. Also, certain food products, such as poultry, have a natural porosity that increases their absorption of $CO_2$, and so would benefit from the capability of the absorbent food pads disclosed herein to generate large amounts of $CO_2$, over an extended time, after the food package is sealed.

The word "about," as used herein for dimensions, weights, weight-percentages, or measures of absorbency, means a range that is ±10% of the stated value, more preferably ±5% of the stated value, and most preferably ±1% of the stated value, including all subranges therebetween.

It should be understood that the foregoing description is only illustrative of the present disclosure. Various alternatives and modifications can be devised by those skilled in the art without departing from the disclosure. Accordingly, the present disclosure is intended to embrace all such alternatives, modifications, and variances that fall within the scope of the disclosure.

What is claimed is:

1. An absorbent food pad comprising:
   a top layer made of a polyethylene film with perforations therethrough;
   a bottom layer made of cellulose tissue;
   a laminate having one or more plies of a cellulosic material and an active agent distributed uniformly in each of the one or more plies in the laminate, wherein each of the one or more plies forms a reservoir of the active agent; and at least two tissue layers, wherein at least a first of the at least two tissue layers is positioned between the top layer and the laminate, and wherein at least a second of the tissue layers is positioned between the laminate and the bottom layer, and wherein the laminate is positioned between the first and second of the at least two tissue layers to form a layered structure that is positioned between the top and bottom layers, the laminate having the reservoirs therein provides an extended release of the active agent over time upon activation, and wherein the first and second of the at least two tissue layers provide extended absorbency of any liquid purge in contact therewith.

2. The absorbent food pad of claim 1, wherein the laminate has at least two plies.

3. The absorbent food pad of claim 1, wherein the at least two tissue layers are four layers.

4. The absorbent food pad of claim 1, wherein two of the four tissue layers are positioned between the top layer and the laminate, and wherein the other two of the four tissue layers are positioned between the laminate and the bottom layer.

5. The absorbent food pad of claim 1, wherein the at least two tissue layers are six layers.

6. The absorbent food pad of claim 1, wherein three of the six tissue layers are positioned between the top layer and the laminate, and wherein the other three of the six tissue layers are positioned between the laminate and the bottom layer.

7. The absorbent food pad of claim 1, wherein the laminate has two plies of cellulose tissue.

8. The absorbent food pad of claim 7, wherein the two plies of laminate are directly adjacent to each other.

9. The absorbent food pad of claim 1, wherein the laminate is made of a mixture of cellulosic material and $CO_2$-generation system that is a mixture of citric acid and sodium bicarbonate.

10. The absorbent food pad of claim 9, wherein the $CO_2$-generation system is activated with water or other liquid to generate $CO_2$.

11. The absorbent food pad of claim 1, wherein the cellulose tissue is a coffee filter tissue.

12. The absorbent food pad of claim 1, wherein the top layer is a film that is polyethylene, polypropylene, polyester, or any combinations thereof.

13. The absorbent food pad of claim 1, wherein the bottom layer is made of coffee filter tissue.

14. The absorbent food pad of claim 1, wherein the top layer and the bottom layer are sealed at an edge around the periphery of absorbent pad to completely enclose the at least two tissue layers.

15. The absorbent food pad of claim 1, wherein the active agent is selected from the group consisting of components of a $CO_2$-generation system, oxygen scavenging system, ethylene inhibitor, an antimicrobial, and any combinations thereof.

16. An absorbent food pad comprising:

a top layer made of a polyethylene film with perforations therethrough;

a bottom layer made of a polyethylene film having perforations therethrough;

a laminate having two plies, each ply comprising a cellulosic material and an active agent distributed uniformly therein, wherein each ply forms a reservoir of the active agent; and five tissue layers positioned between the top layer and the bottom layer, wherein three tissue layers are positioned between the laminate and top layer, and the remaining two tissue layers are positioned between the laminate and the bottom layer, wherein the laminate and the five tissue layers form a layered structure, and wherein the absorbent food pad provides an extended release of the active agent over time upon activation.

17. The absorbent food pad of claim 16, wherein the top layer and the bottom layer are sealed at their edges around the periphery of the absorbent food pad to completely enclose the five tissue layers and the laminate.

18. An absorbent food pad comprising:

a top layer made of polyethylene film with perforations therethrough;

a bottom layer made of coffee filter tissue;

a laminate having one ply comprising a cellulosic material and an active agent distributed uniformly in the ply, wherein the ply forms a reservoir of the active agent; and five tissue layers positioned between the top layer and the bottom layer, wherein three tissue layers are positioned between the laminate and top layer, and the remaining two tissue layers are positioned between the laminate and the bottom layer, wherein the laminate and the five tissue layers form a layered structure, and wherein the absorbent food pad provides an extended release of the active agent over time upon activation.

19. The absorbent food pad of claim 18, wherein the top layer and the bottom layer are sealed at their edges around the periphery of the absorbent food pad to completely enclose the five tissue layers and the laminate.

* * * * *